United States Patent

Williams

(10) Patent No.: US 6,697,725 B1
(45) Date of Patent: Feb. 24, 2004

(54) LOAD-BASED TORQUE REDISTRIBUTION METHOD IN 4-WHEEL DRIVE VEHICLE

(75) Inventor: Cameron Phillip Williams, Marysville, OH (US)

(73) Assignee: Honda Giken Kogyo Kabushiki Kaisha, Raymond, OH (US)

(*) Notice: Subject to any disclaimer, the term of this patent is extended or adjusted under 35 U.S.C. 154(b) by 202 days.

(21) Appl. No.: 09/477,601

(22) Filed: Jan. 4, 2000

(51) Int. Cl.$^7$ .......... G06F 17/00; G06F 19/00; B60T 7/12; G05D 1/00

(52) U.S. Cl. .......... 701/69; 701/81; 701/89; 701/90; 180/249

(58) Field of Search .......... 701/69, 89, 90, 701/81; 180/249

(56) References Cited

U.S. PATENT DOCUMENTS

| | | | |
|---|---|---|---|
| 4,699,236 A | * 10/1987 | Morisawa et al. | 180/249 |
| 4,714,127 A | * 12/1987 | Fanti et al. | 180/233 |
| 4,768,609 A | * 9/1988 | Taga et al. | 180/249 |
| 5,014,809 A | 5/1991 | Matsuda | 180/248 |
| 5,197,566 A | * 3/1993 | Watanabe et al. | 180/249 |
| 5,289,895 A | 3/1994 | Takata et al. | 180/248 |
| 5,517,416 A | * 5/1996 | Torii et al. | 701/50 |
| 5,752,211 A | 5/1998 | Takasaki et al. | 701/69 |
| 5,894,904 A | 4/1999 | Yakou et al. | 180/247 |

FOREIGN PATENT DOCUMENTS

| | | |
|---|---|---|
| JP | 10-194002 | 7/1998 |
| JP | 10-194003 | 7/1998 |
| JP | 10-194004 | 7/1998 |
| JP | 10-194005 | 7/1998 |
| JP | 10-194006 | 7/1998 |
| JP | 10-196685 | 7/1998 |

* cited by examiner

Primary Examiner—William A. Cuchlinski, Jr.
Assistant Examiner—Brian J. Broadhead
(74) Attorney, Agent, or Firm—Armstrong, Kratz, Quintos, Hanson & Brooks, LLP

(57) ABSTRACT

A method for redistributing driving torque between front and rear driving wheels of a vehicle traveling at essentially the same speed. The method includes determining a vehicle condition corresponding to load, based upon at least one vehicle parameter, comparing the determined vehicle condition to a predetermined value, wherein if the determining vehicle condition exceeds the predetermined value, a high load condition exists, and redistributing the driving torque between the front and rear wheels, when the determining step determines that a high load condition exists. By controlling torque redistribution in accordance with one or more high load conditions on the driveline components, subsequent damage of the driveline system can be reduced or prevented.

13 Claims, 11 Drawing Sheets

LOAD-BASED TORQUE REDISTRIBUTION METHOD IN 4-WHEEL DRIVE VEHICLE

BACKGROUND OF THE INVENTION

1. Field of the Invention

The present invention generally relates to a method of redistributing driving torque based on one or more load conditions in a 4-wheel drive (4WD) vehicle. More particularly, it relates to a method of redistributing driving torque among all wheels (e.g., between the front and rear wheels) of a 4WD vehicle based on one or more load conditions that can cause significant damage or wear and tear to driveline components such as CV joints and driveshaft.

2. Description of the Related Art

In 4WD vehicles, various systems are known for distributing driving torque between front and rear wheels. For instance, driving torque can be distributed by employing a limited slip center or inter-axle differential, or by employing a clutch of a hydraulic or electromagnetic type in a torque path for varying the driving torque transmitted there through. The above known driving torque redistribution systems can be used to, e.g., enhance the turning performance of 4WD vehicles. In particular, the driving torque is distributed or transferred based on a difference of speed between the front and rear wheels, engine output when the vehicle speed is less than a given value, or line pressure in a transfer clutch.

Furthermore, most 4WD vehicles are designed so that one pair of wheels (front or rear) is the primary driving wheels and the other pair is the auxiliary driving wheels. In other words, under normal driving conditions, the primary driving wheels receive most of the torque and the auxiliary driving wheels receive a smaller amount of torque (or none at all). In some 4WD vehicles, the primary driving wheels are the front wheels, and in other 4WD vehicles the primary driving wheels are the rear wheels.

When a 4WD vehicle encounters a high load condition caused by climbing a steep hill, towing a trailer, or other heavy load condition, the 4WD vehicle typically requires a large amount of driving torque in its driveline system to cope with the heavy load. Such heavy application of the driving torque to the driveline system inevitably causes wear and tear or even significant damage to various components of the driveline system.

None of the above known driving torque redistribution systems is able to distribute or transfer torque between front and rear wheels based on high load conditions. Accordingly, the above known driving torque redistribution systems cannot prevent wear and tear and damage of the components of the driveline systems when 4WD vehicles encounter one or more high load conditions.

SUMMARY OF THE INVENTION

Accordingly, the present invention is provided in order to increase the life cycle of driveline components by redistributing torque among different wheels in a 4WD vehicle based on one or more high load conditions. For example, in a 4WD vehicle where most (or all) of the driving toque is normally transmitted through the front wheels, when the vehicle encounters a high load condition, a great deal of wear and tear, or even damage, may occur to the drive train components of the front wheels. However, when such a high load condition is sensed, the instant invention transfers an additional amount of torque through the rear wheels, in order to reduce wear and tear or damage to the drive train of the front wheels. Of course, the instant invention also applies to a system where most of the driving torque is normally transmitted through the rear wheels.

Various methods are provided in the torque redistribution method of the present invention that would reduce the torque and the subsequent damage of certain components of the driveline system by controlling torque redistribution among different wheels of the vehicle based on one or more high load conditions on the components of the driveline system.

The load-based torque redistribution system of the instant invention ensures that the excessive torque due to the high load on the front or rear wheels, the primary driving wheels of a 4WD vehicle, is appropriately transferred or distributed to the auxiliary driving wheels so as to alleviate the load and reduce wear and tear.

In accordance with the present invention, a method of redistributing driving torque between front and rear driving wheels of a vehicle, when the front of a rear wheels are traveling at essentially the same speed, includes: determining a vehicle condition corresponding to load, based upon at least one vehicle parameter; comparing the determined vehicle condition to a predetermined value, wherein if the determining vehicle condition exceeds the predetermined value, a high load condition exists; and redistributing the driving torque between the front and rear wheels, when the determining step determines that a high load condition exists.

Additionally, a system for redistributing driving torque distributed between front and rear wheels of a vehicle, when the front and rear wheels are traveling at essentially the same speed, includes: a front driveline for driving the front wheels; a rear driveline for driving the rear wheels; a torque transfer unit connecting the front and rear drivelines for distributing torque, from a power source, between the front and rear drivelines; at least one vehicle sensor; and a controller, coupled to the sensor and the differential, for controlling torque split of the differential in response to the sensor.

Related aspects and advantages of the invention will become apparent and more readily appreciated from of the following detailed description of the invention, taken in conjunction with the accompanying drawings.

DETAILED DESCRIPTION OF THE INVENTION

The present invention will now be described by way of preferred embodiments with reference to the accompanying drawings.

Figure 1:
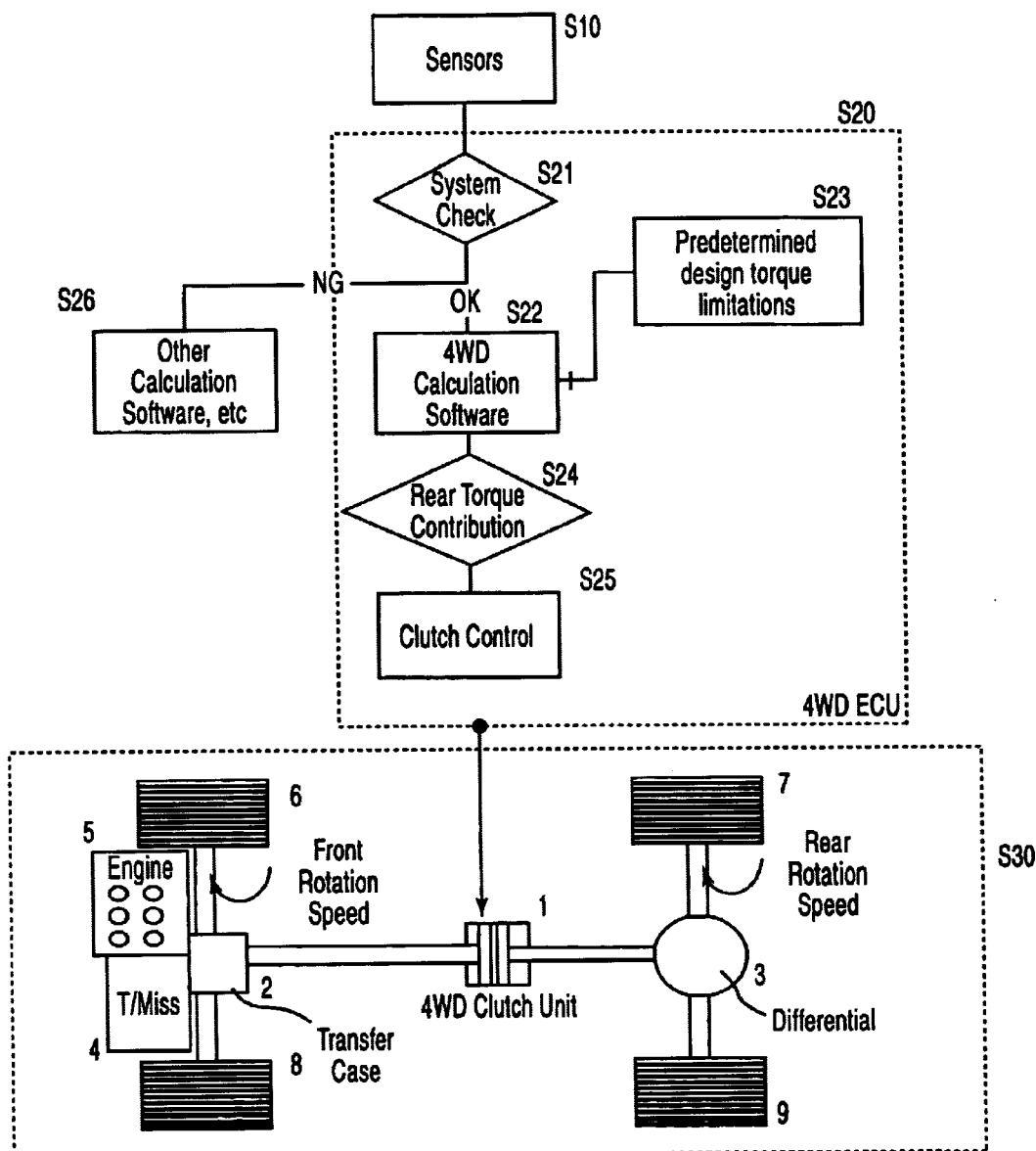
FIG. 1 is a flow diagram for explaining the basic operation of the torque redistribution method according to a preferred embodiment of the present invention.

FIG. 1 shows a basic operation of the torque redistribution method according to the present invention. A signal sensed from a vehicle sensor in the sensor step S10 is processed a controller in the 4WD ECU step S20 that includes the system check step S21, 4WD calculation'software step S22, predetermined design torque limitation step S23, rear torque contribution step S24, and clutch control step S25. A comparator in the 4WD ECU step S20 compares the sensed vehicle parameter from the vehicle sensor corresponding to a vehicle, with a predetermined value to determine if parameters exist to safely redistribute or transfer the torque from the front driveline for driving front wheels to the rear driveline for driving rear wheels so as to ease the load on the front driveline components during a high load condition. If the system check step S21 determines that the signals from the sensor step S10 are valid, then signals are processed by the 4WD calculation software step S22. Otherwise, the signals are processed by another calculation software in step S26. By comparing detected values from the system check step S21 with the predetermined values from the predetermined design torque limitation step S23, the 4WD calculation software step S22 allows the rear torque contribution step S24 to determine the amount of rear torque contribution to be executed. For this system, the torque is varied using an electromagnetic clutch system. The clutch control step S25 controls current in the torque application step S30, which shows various components of a 4WD vehicle with front wheels as primary driving wheels, including a 4WD clutch unit 1, a transfer case 2, a differential 3, a transmission 4, an engine 5, front wheels 6, and rear wheels 7. In particular, the clutch control step S25 regulates the electric current supplied to the 4WD clutch unit 1 so that the split of torque to front and rear wheels can be controlled based on the determined high load condition.

Moreover, a power source such as the engine 5 transfers power through the transmission 4, transfer case 2, and 4WD clutch control 1, and is supported by one or more current operated clutches in the 4WD clutch unit 1 for changing the torque split between the front and rear wheels in response to one or more vehicle sensor in the sensor step S10, which is coupled to the differential 3 via the controller in the 4WD ECU step S20 for controlling the torque split. The 4WD clutch unit 1 has a torque transfer unit that includes the ability to transfer varying amounts of torque such as a hydraulic wet clutch or electromagnetic clutch. This system must enable clutch slip or some other speed sensitive compensating method or device to counteract the differential speeds between the front and rear wheels during redistribution of the driving torque.

Since the rotational speed of the front and rear wheels is not in a one to one ratio (1:1), the 4WD clutch unit 1 as shown in FIG. 1 cannot remain in a full-lock condition for an extended period of time. Accordingly, some slips are required to transfer partial torque (i.e., 50% or less of the total) and equalize the speed difference.

Figure 2:
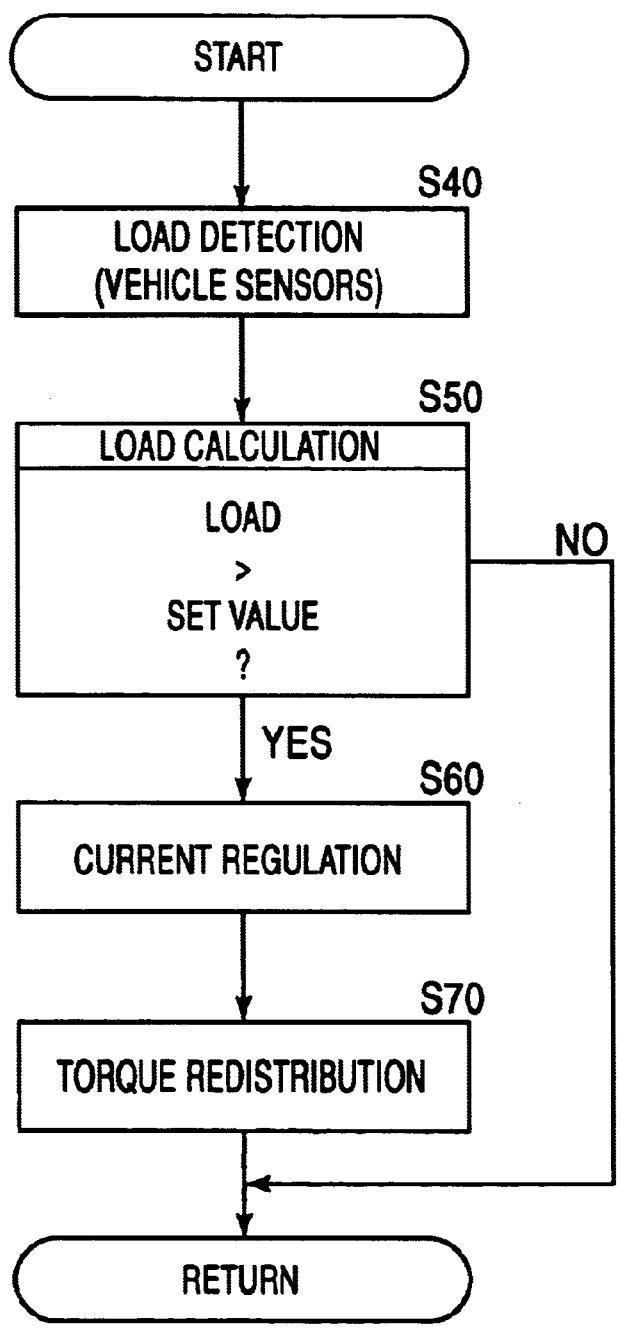
FIG. 2 is a flow diagram for explaining the torque redistribution method of the present invention.
Figure 3:
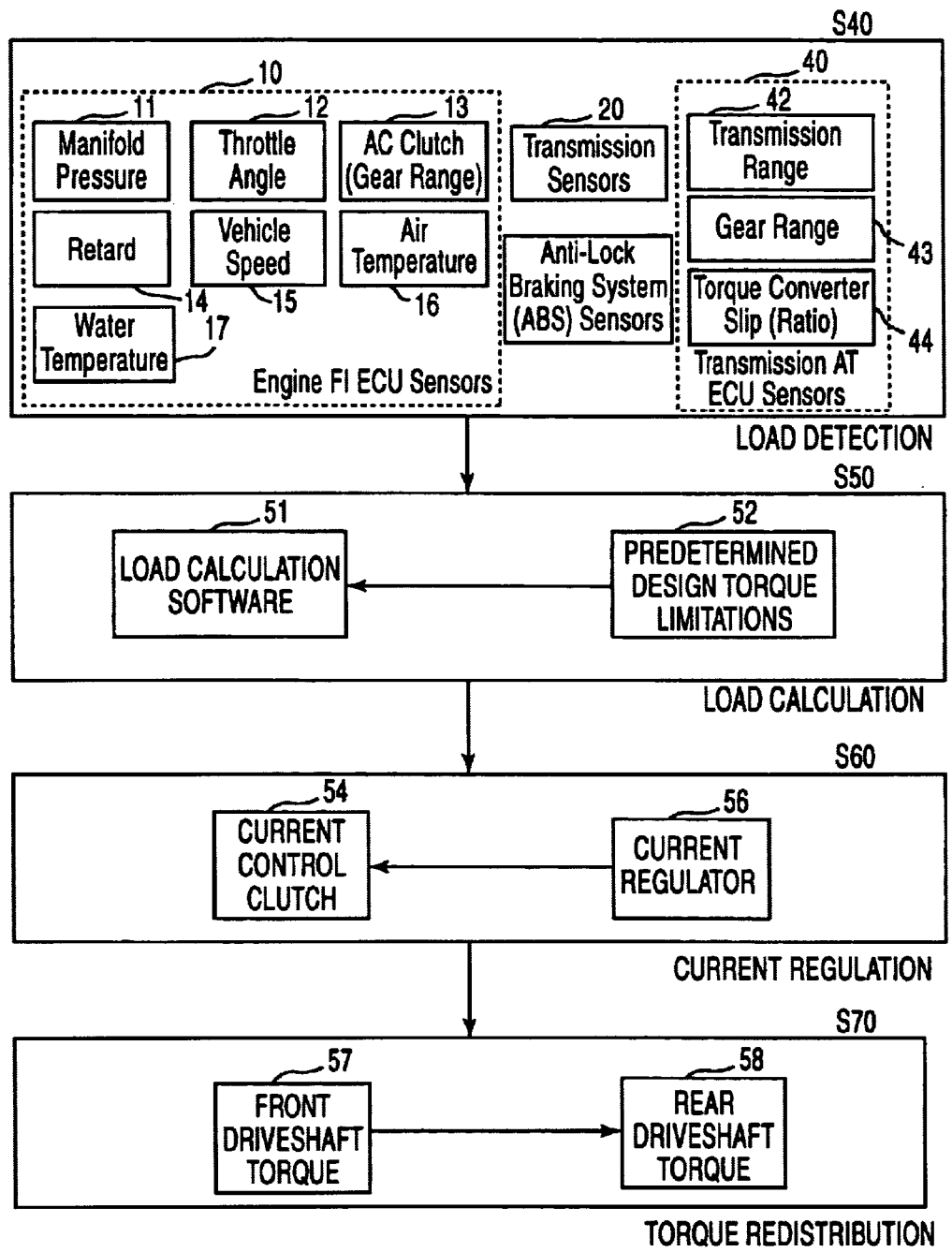
FIG. 3 is a detailed flow diagram of FIG. 2.

Referring to FIGS. 2 and 3, the torque redistribution method of the present invention includes a load detection step S40 that uses various vehicle sensors such as engine FI electronic control unit (ECU) sensors 10, anti-lock braking system (ABS) sensors 30, transmission sensors 20, and transmission AT ECU sensors 40 to detect one or more load conditions of the 4WD vehicle. In particular, the engine FH ECU sensors 10 can be used to detect the manifold pressure 11, throttle angle 12, AC clutch gear 13, engine retard 14, vehicle speed 15, air temperature 16, and water temperature 17 while the transmission AT ECU sensors 40 can be used to detect transmission range 42, gear range 43, and torque converter slip (ratio) 44. Additionally, signals from the FI ECU sensors 10 and transmission sensors 20 can be used to calculate the total driveshaft torque in the load calculation step S50. If the total driveshaft torque is determined to be above a certain predetermined torque value in the load calculation step S50, the current of a current control clutch 54 is controlled by a current regulator 56 in the current regulation step S60, and the front driveshaft torque 57 is redistributed to the rear drive shaft torque 58 in the torque redistribution step S70. In other words, if a load calculation software 51 of the load calculation step S50 determines that the load (e.g., the driveshaft torque) is above a predetermined design torque limitation or value 52, then the torque redistribution between front and rear wheels will be executed to reduce or prevent damage to the driveline components.

After determining in the load calculation step S50 that torque redistribution is required, the current controlled clutch 54 is activated in the current regulation step S60 according to the current regulator 56 to redistribute torque from, e.g., the front wheels of the front driven 4WD vehicle to the rear wheels.

Alternatively, input signals from a vehicle speed sensor 15, throttle angle sensor 12, and gear range sensor 4 detected in the load detection step S40 may be used in the load calculation step S50 to calculate the actual acceleration of the vehicle at a given throttle. In the load calculation step S50, the actual acceleration is compared with the stored acceleration data, which contain information on the acceleration of the vehicle on level ground with only the vehicle and passenger weight in order to determine whether the torque redistribution in the torque redistribution S70 is necessary.

Still further, signals from the transmission sensors, including signals from one or more pressure switches in the transmission, can be used to calculate the increase in the line pressure due to a reactor arm and pressure regulators in the transmission. The increase in the line pressure is used to determine whether torque redistribution in S70 is necessary.

Figure 4:
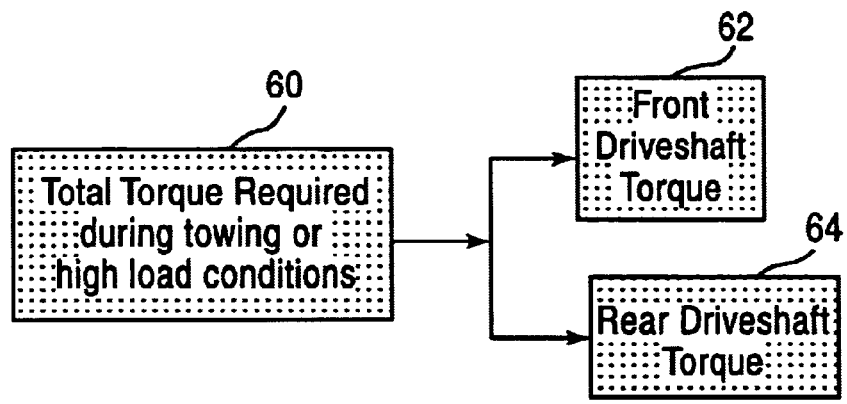
FIG. 4 is a flow diagram showing total torque distribution according to the preferred embodiment of the present invention.
Figure 5:
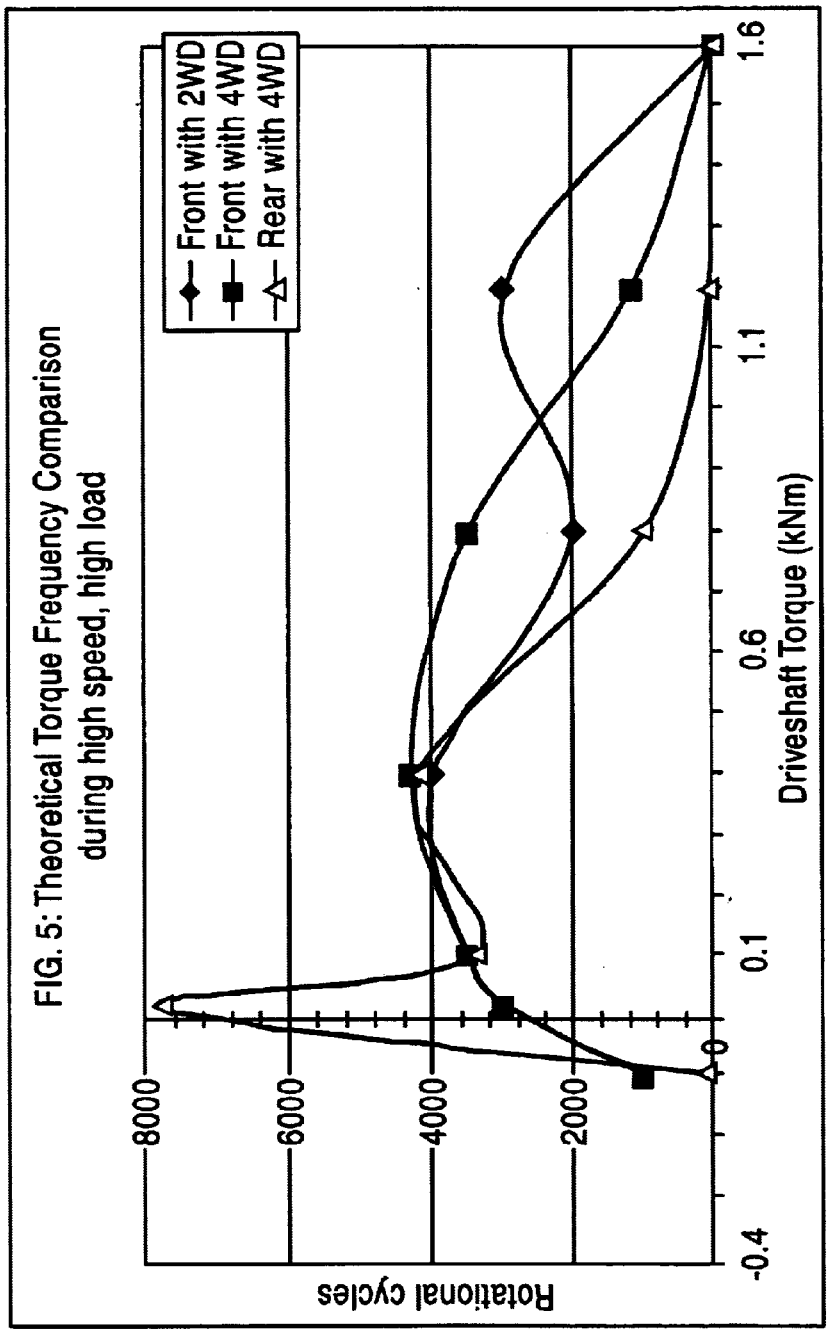
FIG. 5 is a torque frequency comparison chart for 4-wheel and 2-wheel drive modes.

As illustrated in FIG. 4, the total torque 60 required during towing or high load conditions can be divided into front driveshaft torque 62 and rear driveshaft torque 64. A torque frequency (S-N) graph shown in FIG.S illustrates the number of rotations of the driveline components for a given load condition (e.g., towing). By redistributing the torque between the front and rear wheels, the S-N graph indicates that the high load cycles, which is capable of causing significant damage, can be reduced by redistributing the remaining needed torque to the rear driving wheels of the front driving 4WD vehicle. The increase in the number of rotational cycles of the front torque is equivalent to the torque cycles distributed to the rear wheels. This increases the lower torque cycles for the primary driving components but these smaller torque levels cause significantly less damage to components.

Figure 6:
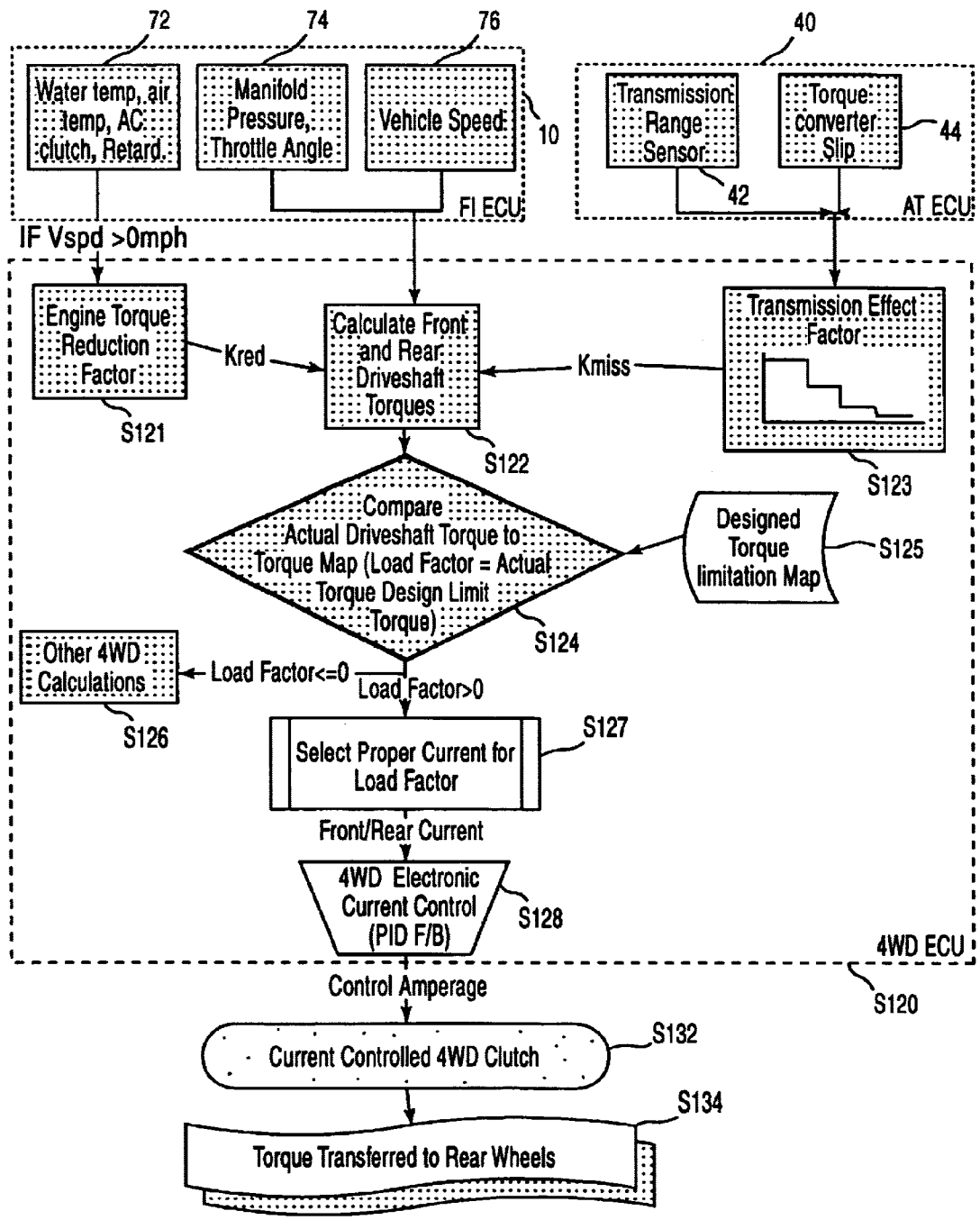
FIG. 6 is a flow diagram showing a second embodiment of the present invention.

FIG. 6 shows another embodiment of the present invention which uses software control based on the calculated torque. More specifically, if the vehicle is moving (i.e., Vspd>0 mph), then (1) signals from a first sensor group 72 of the engine FI ECU sensors 10 regarding water temperature, air temperature, AC clutch, and retard are processed by the engine torque reduction factor step S121 in 4WD ECU step S120; and (2) signals regarding the transmission range 42 and torque converter slip derived from the AT ECU sensors 40 are processed by the transmission effect factor step S123 in 4WD ECU step S120. Thereafter, factors from steps S121 and S123, along with signals from a second sensor group 74 regarding the manifold pressure and throttle angle, and signals from a third sensor group 76 regarding the vehicle speed are processed in order to calculate front and rear driveshaft torques in step S122. A comparison step S124 compares the actual driveshaft torque received from step S122 and the stored torque map received from the designed torque limitation map step S123 to determine whether the load factor is equal to the difference between the actual torque and the stored torque in the map. If the load factor is less than or equal to zero, then the 4WD ECU step S120 is proceeded to other 4WD calculation step 126. If the load factor is greater than zero, then the 4WD ECU step S120 is proceeded to the select proper current for load factor step S127. The front or rear current from S127 is then used by the 4WD electronic current control step S128 to control amperage. The control amperage from the 4WD ECU step S120 is received by the current controlled 4WD clutch step S132, and applied by the torque transferred to rear wheel step S134.

Figure 7:
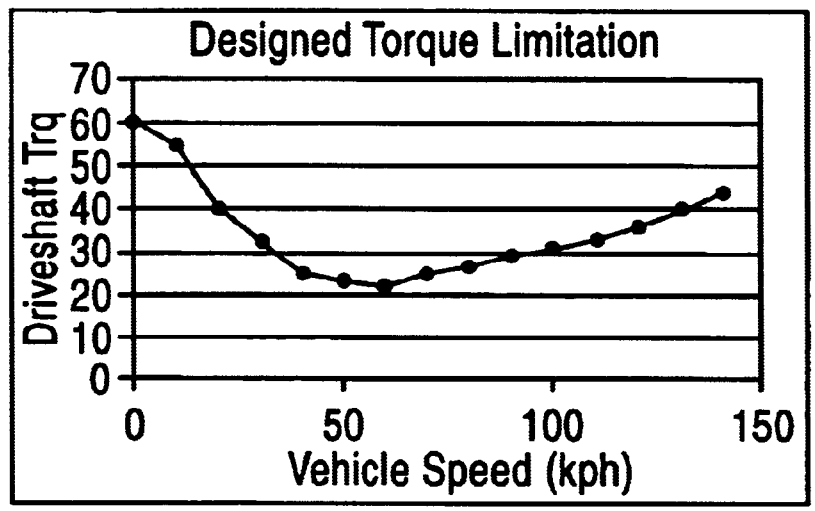
FIG. 7 is a design torque limitation map for the flow diagram of FIG. 6.

FIG. 7 is a chart showing a design torque limitation map in terms of vehicle speed and driveshaft torque for the flow diagram of FIG. 6

Figure 8:
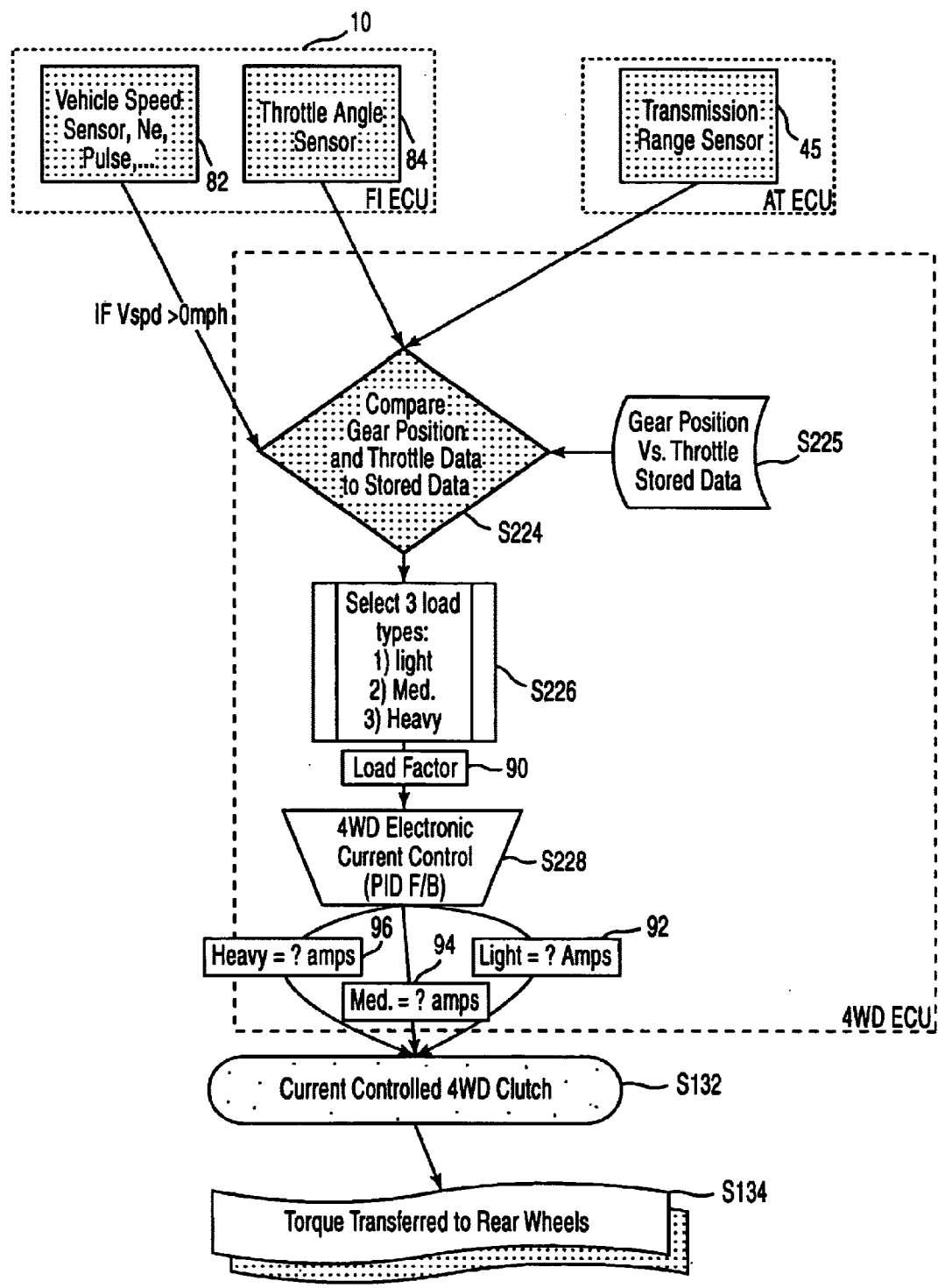
FIG. 8 is a flow diagram showing a third embodiment of the present invention.

FIG. 8 shows still another embodiment of the present invention which uses software control based on gear and throttle positions. More specifically, if the vehicle is moving (i.e., Vspd>0 mph), then (1) signals from a first sensor group 82 of the engine FI ECU sensors 10 regarding vehicle speed; (2) signals from a second sensor group 84 of the engine FI ECU sensors 10 regarding throttle angle; (3) signals regarding the transmission range 45 from the AT ECU sensors 40 are received by the 4WD ECU step S220. A comparing step S224 in the 4WD ECU step S220 compares the gear position and throttle data to the stored data from the storing step S225 (gear position versus throttle stored data). In step S226, one of the three load types, i.e., light, medium, or heavy is selected, and a corresponding load factor 90 is processed by the 4WD electronic current control step S228 (PID F/B). One of the control amperages 92, 94, and 96 (i.e., heavy, medium or light) from the 4WD ECU step S220 is received by the current controlled 4WD clutch step S132, and applied by the torque transferred to rear wheel step S134.

Figure 9:
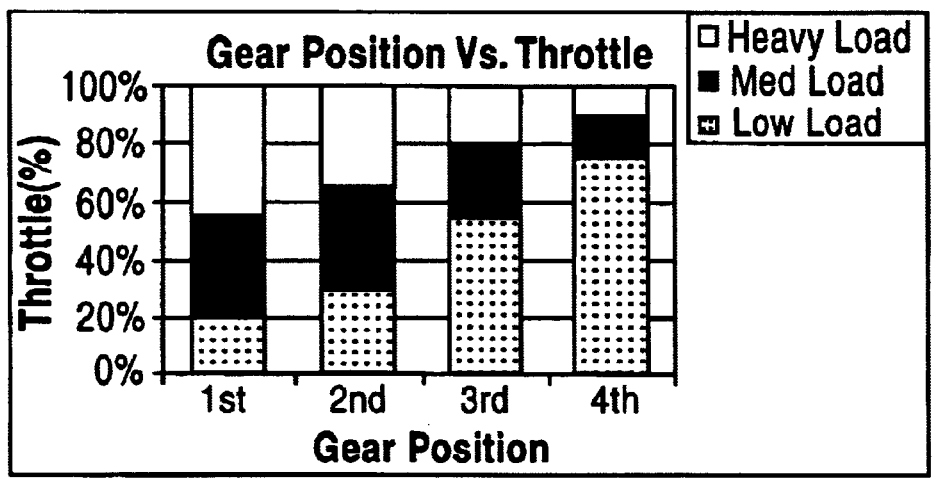
FIG. 9 is a chart showing gear and throttle positions for the flow diagram of FIG. 8.

FIG. 9 is a chart showing gear and throttle positions during heavy, medium, and low loads for the flow diagram of FIG. 8.

Figure 10:
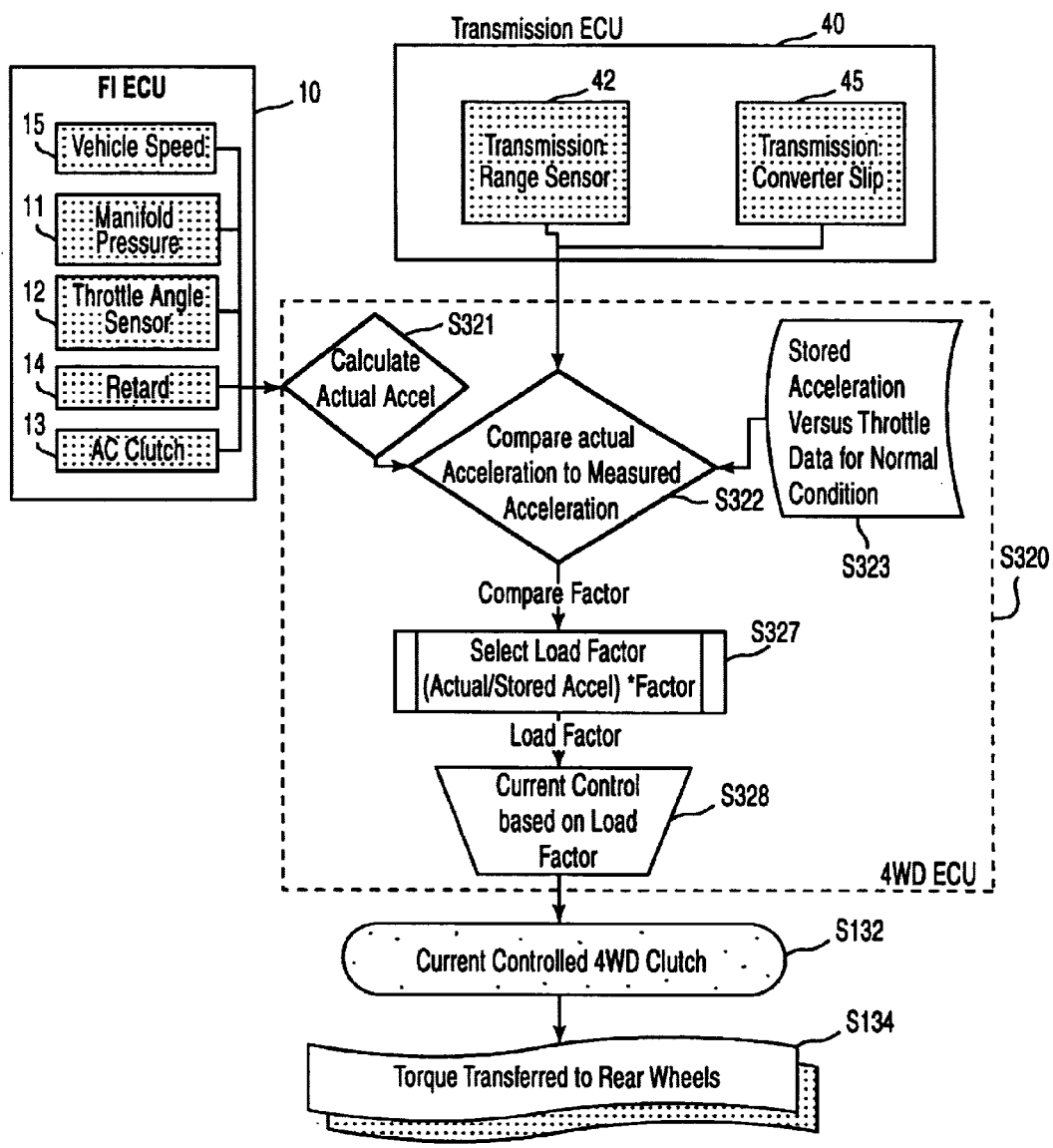
FIG. 10 is a flow diagram showing a fourth embodiment of the present invention.

FIG. 10 shows yet another embodiment of the present invention which uses software control based on acceleration. More specifically, if the vehicle is towing or going uphill during cruise condition, then (1) signals from the engine FI ECU sensors 10 regarding vehicle speed 15, manifold pressure 11, throttle angle 12, retard 14 and AC clutch 13 are processed by the calculate actual acceleration step S321 in 4WD ECU step S320. Thereafter, (1) signals regarding the transmission range 42 and transmission converter slip 45 derived from the AT ECU sensors 40; (2) the calculated actual acceleration from step S321; and (3) stored acceleration from step S323 (stored acceleration versus throttle data for normal condition) are processed by step S322 to compare actual acceleration with measure acceleration in the 4WD ECU. The compared factor is proceeded then to step S327 in which a load factor is selected (i.e., select load factor (actual/stored acceleration * factor)). The current controlled by step S328 in the 4WD ECU step S320 is then processed by the current controlled 4WD clutch step S32, and applied by the torque transferred to rear wheel step S34.

The torque redistribution method of the present invention is applicable to any front or rear wheel drive 4WD vehicle having front and rear wheels connected or engaged there between by an electromagentic, hydraulic or similar type of clutch system. Additionally, the torque redistribution method of the present invention is operable when the 4WD vehicle is moving and when all the wheels of the vehicle are moving at the same speed. In order to counteract the differential speeds between the front and rear wheels when transferring torque, the 4WD vehicle incorporates a clutch system capable of compensating the speed differences between the front and rear axles. The compensating device can also be incorporated in the transfer case, clutch system, or rear differential.

Since any damage to the driveline components from the high load condition would be a powered function of the torque applied to the components according to the damage theories such as the Mirev's theory, the torque redistribution method of the present invention would allow the driveline components to be manufactured at a lower tolerance or strength and yet achieve the same or increased life cycle. Examples of the driveline components in the 4WD vehicle include CV joints, bearings, final drive differential gear, driveshaft, and other rotating components between the wheels and transfer case.

Figure 11:
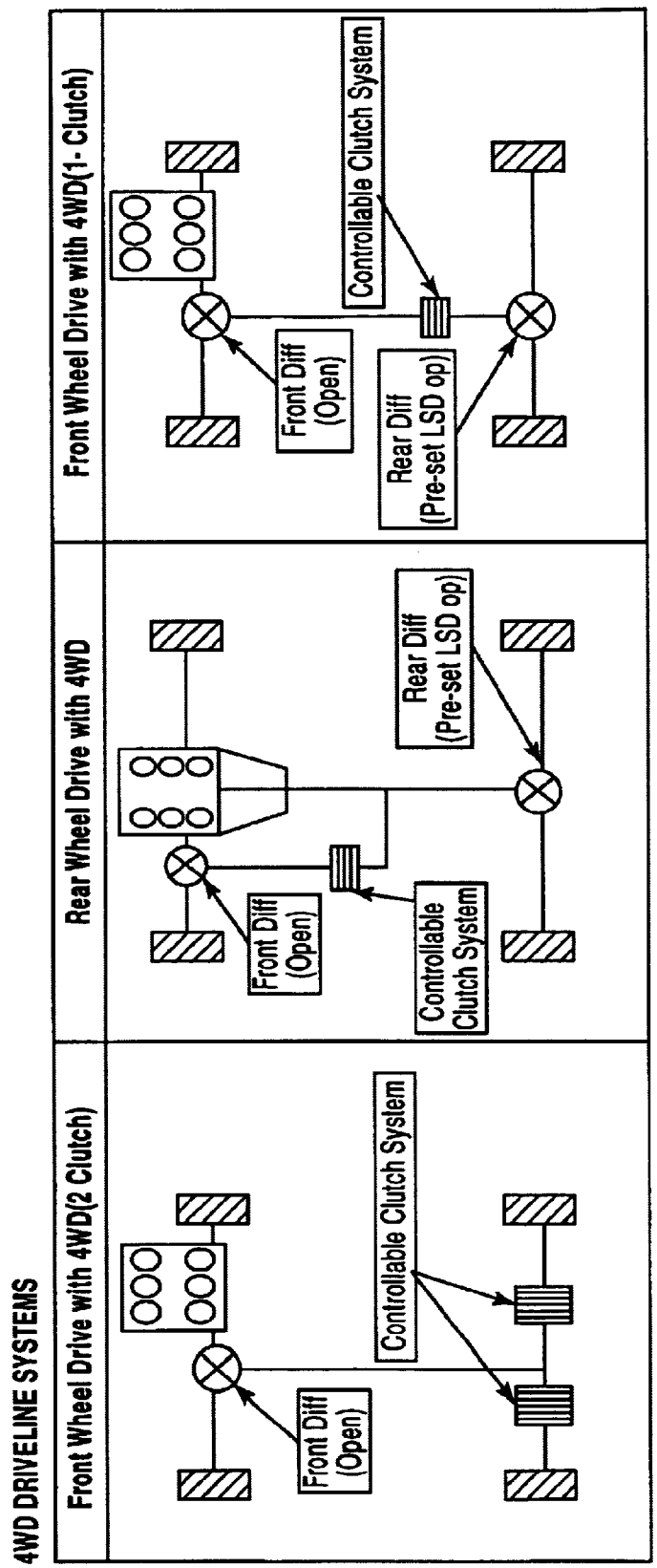
FIG. 11 is a flow diagram showing 4-wheel driveline systems.

FIG. 11 shows different 4-wheel driveline systems, including a front wheel drive system with 4WD and 2-clutch, a rear wheel drive system with 4WD, and a front wheel drive with 4WD and 1-clutch. In the various 4-wheel driveline systems as shown in FIG. 11, the optional driving wheels are operated using a controllable clutch system with a wet clutch system. However, Gerotor type clutches or hydraulic clutches can also be used for the same purpose.

Although a specific form of embodiment of the present invention has been described above and illustrated in the accompanying drawings in order to be more clearly understood, the above description is made by way of example and not as a limitation to the scope of the present invention. It is believed that various modifications apparent to one of ordinary skill in the art could be made without departing from the scope of the present invention.

What is claimed is:

1. A method of redistributing driving torque between front and rear driving wheels of a vehicle, when the front and rear wheels are traveling at essentially the same speed, said method comprising the steps of:

determining a vehicle condition corresponding to load, based upon at least one vehicle parameter;

comparing the determined vehicle condition to a predetermined value, wherein if the determining vehicle condition exceeds said parameter predetermined value, a high load condition exists; and redistributing the driving torque between the front and rear wheels, when the determining step determines that a high load condition exists.

2. The method of claim 1, wherein said determining step includes calculating front and rear driveshaft torque, and said comparing step includes comparing said front and rear driveshaft torque with a stored torque map.

3. The method of claim 2, wherein the front and rear driveshaft torque is based upon detected throttle angle and vehicle speed.

4. The method of claim 1, wherein said determining step determines the vehicle condition based upon detected gear position and throttle data.

5. The method of claim 1, wherein said determining step determines the vehicle condition based upon detected transmission line pressure.

6. The method of claim 1, wherein said determining step includes determining vehicle acceleration, and said comparing step compares the determined vehicle acceleration with a stored vehicle acceleration value.

7. The method of claim 1, wherein said redistributing step includes compensating for speeds between the wheels when torque is being redistributed.

8. The method of claim 1, wherein said redistributing step includes regulating electric current supplied to clutches for controlling the split of torque to front and rear wheels, based on the determined high load condition.

9. A system for redistributing driving torque distributed between front and rear wheels of a vehicle, when the front and rear wheels are traveling at essentially the same speed, said system comprising:

a front driveline for driving the front wheels;

a rear driveline for driving the rear wheels;

a torque transfer unit connecting said front and rear drivelines for distributing torque, from a power source, between said front and rear drivelines;

at least one vehicle sensor; and a controller, coupled to said sensor and said torque transfer unit, for controlling torque split of said torque transfer unit in response to said sensor, wherein said controller includes a comparator for comparing a sensed vehicle parameter from said sensor, corresponding to a vehicle load, with a predetermined value and, if the sensed vehicle parameter exceeds said predetermined value, a high load condition exists and the driving torque is redistributed between the front and rear wheels.

10. The system of claim 9, wherein said torque transfer unit includes a plurality of current operated clutches for changing the torque split of said torque transfer unit.

11. The system of claim 9, wherein said controller also includes a current regulator for providing regulated current to clutches, in response to an output from the comparator.

12. The system of claim 9, wherein said torque transfer unit has the ability to transfer varying amounts of torque such as a hydraulic web clutch or electromagnetic clutch.

13. The system of claim 12, further comprising speed compensating or slip means for counteracting a differential speed between front and rear wheels.

* * * * *